United States Patent
Glowacki et al.

(10) Patent No.: US 12,509,325 B2
(45) Date of Patent: Dec. 30, 2025

(54) ELEVATOR SYSTEM WITH TOUCHLESS ELEVATOR CALL ENTRY

(71) Applicant: INVENTIO AG, Hergiswil (CH)

(72) Inventors: Jakub Glowacki, Madison, NJ (US); John Carlson, East Hanover, NJ (US); Frank Pyzak, Secaucus, NJ (US)

(*) Notice: Subject to any disclaimer, the term of this patent is extended or adjusted under 35 U.S.C. 154(b) by 1469 days.

(21) Appl. No.: 17/078,541

(22) Filed: Oct. 23, 2020

(65) Prior Publication Data
US 2022/0127112 A1   Apr. 28, 2022

(51) Int. Cl.
| B66B 1/46 | (2006.01) |
| B66B 1/52 | (2006.01) |
| B66B 3/00 | (2006.01) |
| G01S 13/04 | (2006.01) |
| G06F 3/01 | (2006.01) |

(52) U.S. Cl.
CPC ........... B66B 1/468 (2013.01); B66B 1/52 (2013.01); B66B 3/002 (2013.01); G01S 13/04 (2013.01); G06F 3/017 (2013.01); *B66B 2201/102* (2013.01); *B66B 2201/4623* (2013.01); *B66B 2201/4638* (2013.01)

(58) Field of Classification Search
CPC ........... B66B 1/468; B66B 1/52; B66B 3/002; B66B 2201/102; B66B 2201/4623; B66B 2201/4638; B66B 1/461; B66B 1/462; G01S 13/04; G01S 7/28; G01S 13/56; G01S 7/415; G06F 3/017
See application file for complete search history.

(56) References Cited

U.S. PATENT DOCUMENTS

| 11,472,662 B2* | 10/2022 | Adifon | ............. B66B 1/468 |
| 2017/0297864 A1* | 10/2017 | Koivisto | ............ G06F 3/017 |
| 2022/0017327 A1* | 1/2022 | Adifon | ............ B66B 19/007 |

FOREIGN PATENT DOCUMENTS

| EP | 3412613 A1 * | 12/2018 | ........... B66B 1/2408 |
| KR | 20160064522 A * | 6/2016 | |
| KR | 20170136176 A * | 12/2017 | |
| WO | WO-2016184519 A1 * | 11/2016 | ............. B66B 1/463 |
| WO | WO-2018141352 A1 * | 8/2018 | ........... B66B 1/3492 |
| WO | WO-2020079317 A1 * | 4/2020 | |

* cited by examiner

*Primary Examiner* — Jeffrey Donels
(74) *Attorney, Agent, or Firm* — Schlee IP International, PC; Alexander R. Schlee; Pascal A. Schlee

(57) ABSTRACT

An elevator system has an elevator controller system to control movement of an elevator car between a predetermined number of floors of a building, and an elevator operating panel communicatively coupled via a multicore cable to the elevator controller system. The elevator operating panel includes at least one push-button having an open state and a closed state, wherein the push-button is configured to close in the closed state a wire loop of the multicore cable, and wherein the push-button is configured to be in the closed state when a user presses the push-button to enter an elevator call. In addition, the elevator system includes an ancillary operating panel arranged next to the elevator operating panel and having a proximity sensor for touchless entry of an elevator call.

10 Claims, 2 Drawing Sheets

ELEVATOR SYSTEM WITH TOUCHLESS ELEVATOR CALL ENTRY

BACKGROUND OF THE INVENTION

The present disclosure of various embodiments generally relates to an elevator system and its operation. More specifically, the various embodiments described herein relate to an elevator system providing improved passenger comfort and confidence when using an elevator, and a method of controlling the operation of such an elevator system.

Multi-story residential and commercial buildings often have elevator systems to transport users (e.g., tenants and visitors) from a boarding floor to a destination floor. In an elevator system that is equipped with a conventional up/down control technology, in order to request elevator service, i.e., to call an elevator or to enter an elevator call, a user may press an up button or a down button of a floor operating terminal to enter a desired travel direction. Once the user is inside the elevator car assigned to service the elevator call, the user may press a further button to enter the desired destination floor. In an elevator system that is equipped with a destination call control technology, a user may have to press a button on a floor terminal to enter the destination floor. Depending on its configuration, an elevator system may require a user to present some form of credential (e.g., key, optical code (e.g., barcode, QR code) on a physical carrier, RFID badge or access code via a mobile phone) to allow entry of an elevator call.

In addition to providing such transportation to building users, building owners and/or building operators (building management) provide for a safe and clean environment within buildings. Of particular concern are operating terminals and push-buttons users must touch to enter elevator calls. Users may worry that these terminals and buttons contribute to the spreading of bacteria and/or viruses to healthy users. To address such concerns, building management may enhance its cleaning and disinfection efforts.

Such efforts and procedures may increase a user's confidence when seeking to use an elevator. However, some of the mentioned systems using credentials are rather complex, and cleaning and disinfection efforts may still not provide enough comfort to users. There is, therefore, a need for a technology that overcomes at least some of these issues.

SUMMARY OF THE INVENTION

One aspect of such technology relates to an elevator system having an elevator controller system configured to control the elevator system to move an elevator car between a predetermined number of floors of a building. The elevator system has an elevator operating panel communicatively coupled via a multicore cable to the elevator controller system and an ancillary operating panel arranged next to the elevator operating panel. The elevator operating panel includes at least one push-button having an open state and a closed state, wherein the push-button is configured to close in the closed state a wire loop of the multicore cable, and wherein the push-button is configured to be in the closed state when a user presses the push-button to enter an elevator call. The ancillary operating panel has a proximity sensor configured to output a sensor signal to a switch interface if an object presented by the user is within a preset detection range of the proximity sensor. The sensor signal causes the switch interface to change from an open state to a closed state, wherein the switch interface is configured to close in the closed state the wire loop when the user presents the object to enter an elevator call without physical contact with the ancillary operating panel.

In accordance with the technology described herein, an elevator operating device is supplemented with an ancillary elevator operating device. The elevator operating device may be arranged on a floor and allow a user to enter, for example, a desired travel direction by pressing an up or down push-button. The elevator operating device may be arranged inside an elevator car and allow the user to enter a desired destination floor. The ancillary elevator operating device allows the user to request an elevator service without having to touch an elevator push-button or another surface of an elevator operating device. For example, the user can enter an elevator call by holding an object, such as a hand, or part of it, in front of the ancillary elevator operating device so that the hand is within the sensor's detection range. The sensor in the ancillary elevator operating device detects the hand and causes closing of a wire loop. In response to that loop closing, the elevator control system registers the elevator call.

The ancillary elevator operating device is arranged next to the push-button equipped elevator operating device and electrically connected in parallel to the push-button equipped elevator operating device. Installation work is, therefore, relatively minor. Further, this allows that an elevator system that has already been in operation for some time can be provided with a touchless call entry option at any time when a need for such an option arises.

In certain embodiments of the technology described herein it is an advantage that the ancillary elevator operating device can be used intuitively. The ancillary elevator operating device may be provided with at least one of a pictogram, text (one or more words) and a symbol that indicates to the user how to proceed (e.g., wave your hand). In addition, in one embodiment, a light source in the ancillary elevator operating device lights up to confirm to the user that the elevator call has been registered.

The ancillary operating panel may be configured depending on the location of its installation in the building. For example, an ancillary operating panel arranged on one of the floors is provided with a proximity sensor that is assigned to a predetermined travel direction. An uppermost floor may be provided with an ancillary operating panel that allows calling an elevator only for the downward travel direction, and a lowermost floor may be provided with an ancillary operating panel that allows calling an elevator only for the upward travel direction. At an intermediate floor between the uppermost and lowermost floors, the ancillary operating panel may include two proximity sensors, one being assigned to the upward travel direction and the other being assigned to the downward travel direction. At these ancillary operating panels, for example, a user on one of these floors may wave a hand in front of the proximity sensor assigned to the desired travel direction to enter an elevator car.

In addition, or in the alternative, an ancillary operating panel, in one embodiment, may be arranged in the elevator car. Such an ancillary operating panel includes a predetermined number of proximity sensors, wherein the predetermined number corresponds to the predetermined number of floors in the building. Each proximity sensor is assigned to one of the floors. Hence, the technology described herein allows entry of a destination floor from within the elevator car without having to physically contact a push-button.

In one embodiment, the ancillary operating panel includes a cover arranged in front of the proximity sensor. The cover protects the interior of the ancillary operating panel, including its proximity sensor and any other electronic component, from dust, moisture and/or vandalism.

In addition, the cover may be used to provide operating instructions and/or other information to the user. In one embodiment, the cover includes at least one of a pictogram, text and a symbol. These instructions and/or information contribute to the panel's easy and intuitive use.

In one embodiment, the proximity sensor of the ancillary operating panel includes a radar sensor. A detection range of the radar sensor can be adjusted to a range suitable for the ancillary operating panel at a specific location within the building. Further, the radar sensor may be covered by a cover that is transparent for the electromagnetic radiation transmitted and received by the radar sensor.

In one embodiment, the ancillary operating panel includes a light source configured to light up in response to the user presenting the object. Such an optical feedback communicates to the user that the elevator call has been registered.

BRIEF DESCRIPTION OF THE DRAWINGS

Various aspects of the improved technology are described in greater detail below with reference to exemplary embodiments in conjunction with the drawings. In the figures, identical elements have identical reference numerals. In the figures.

DETAILED DESCRIPTION OF THE INVENTION

Figure 1A:
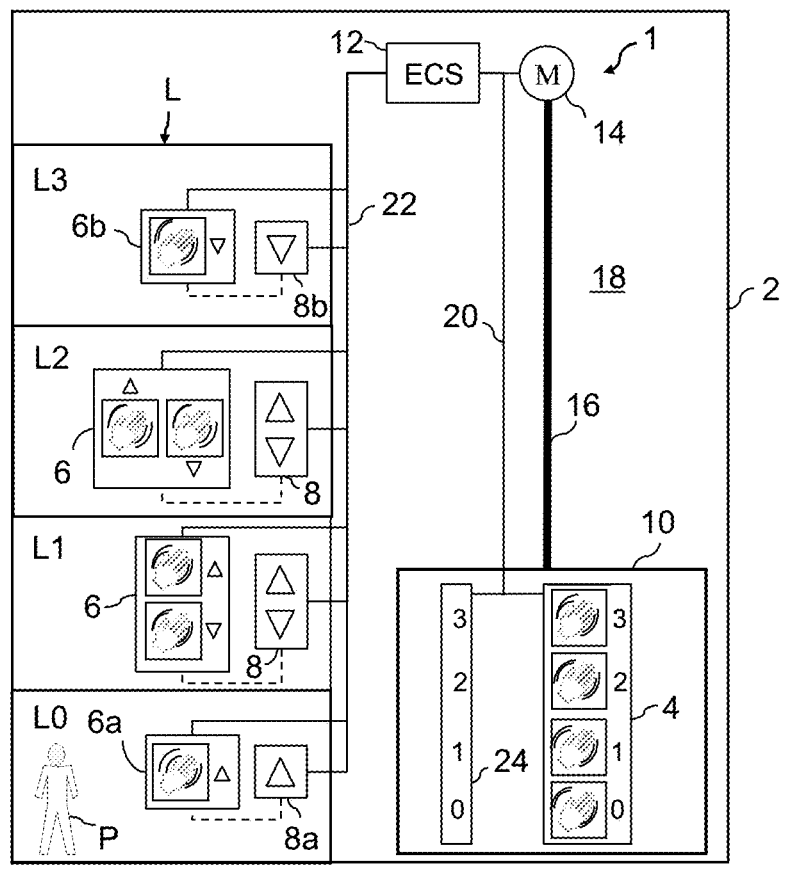
FIG. 1a shows a schematic illustration of an exemplary situation in a building having an elevator system with a plurality of elevator operating devices configured for touchless call entry.

FIG. 1a is a schematic illustration of an exemplary situation in a building 2 having a predetermined number of floors L. For illustrative purposes, FIG. 1a shows four floors L0, L1, L2, L3; however, it is contemplated that the building may have less or more floors L. The building 2 includes an elevator system 1 to service these floors L. In the schematic illustration of FIG. 1a, an elevator control system (ECS) 12, a drive machine 14, a suspension element 16 (e.g. steel cables or flat belts), an elevator car 10 (hereinafter also referred to as car 10) and a number of elevator operating devices 4, 6, 6a, 6b, 8, 8a, 8b are shown. The elevator car 10 is suspended from the suspension element 16 and controlled by the elevator control system 12 to move in a shaft 18 between the floors L. The car 10 includes elevator operating devices 4, 24 which a multicore cable 20 couples to the elevator control system 12. The person of ordinary skill in the art recognizes that the elevator system 1 may comprise a plurality of cars 10 in one or more shafts 18, which may be controlled by a group controller. Instead of a traction elevator shown in FIG. 1a, the elevator system 1 can also have one or more hydraulic elevators.

In the illustrated embodiment, the elevator system 1 is configured to operate according to a (conventional) up/down control technology. At an elevator operating device 6, 6a, 6b, 8, 8a, 8b on a boarding floor, a user P can enter the travel direction (up/down) to call the elevator car 10 to the boarding floor; the up/down directions are depicted in FIG. 1a as triangles. When a distinction between the elevator operating devices 6, 6a, 6b, 8, 8a, 8b is believed to assist readability, the elevator operating devices 8, 8a, 8b are hereinafter referred to as landing operating panels (LOPs) 8, 8a, 8b, and the elevator operating devices 6, 6a, 6b are hereinafter referred to as ancillary landing operating panels (ancillary LOPs) 6, 6a, 6b. At the elevator operating devices 4, 24 in the elevator car 10, the user P—after boarding the elevator car 10—can enter a destination floor. Again, when a distinction between the elevator operating devices 4, 24 is believed to assist readability, the elevator operating device 24 in the car 10 is hereinafter referred to as car operating panel (COP) 24, and the elevator operating device 4 in the car 10 is hereinafter referred to as ancillary car operating panel (ancillary COP) 4. In one embodiment, the car operating panels 4, 24 may have a plurality of individually numbered push-buttons or numbered areas corresponding to the number of floors L in the building 2. Floor labels on or next to these push-buttons or areas may specify names (persons, firms or companies) or services (reception, dentist, restaurant, gym) located on the building floors.

A multicore cable 22 couples the elevator operating devices 6, 6a, 6b, 8, 8a, 8b to the elevator control system 12. The multicore cable 22 includes a predetermined number of individual electrical wires for conducting dedicated signals between the elevator control system 12 and the elevator operating devices 6, 6a, 6b, 8, 8a, 8b. In one embodiment, the ancillary LOPs 6, 6a, 6b may be coupled directly to the multicore cable 22. In another embodiment, the ancillary LOPs 6, 6a, 6b may be coupled (indirectly) to the multicore cable 22 via the LOPs 8, 8a, 8b; in FIG. 1a, this is indicated by dashed lines connecting the ancillary LOPs 6, 6a, 6b and the LOPs 8, 8a, 8b. Correspondingly, the ancillary COP 4 may be coupled directly to the multicore cable 20 or indirectly via the COP 24. Compared to the direct coupling, the indirect coupling may be performed with less installation work, and, hence, may be preferred in buildings 2 in which the existing elevator system 1 is to be modified with a touchless call entry option.

Figure 1B:
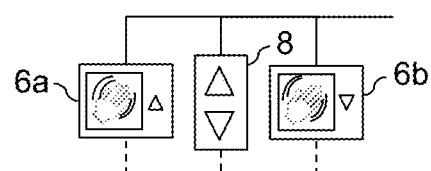
FIG. 1b shows a schematic illustration of an exemplary arrangement of ancillary elevator operating devices and a conventional operating device for entry of elevator calls in an upward direction and a downward direction.

FIG. 1a shows the LOPs 8, 8a, 8b and the ancillary LOPs 6, 6a, 6b in different configurations to illustrate exemplary arrangements within the elevator system 1. As described below in more detail, the ancillary LOPs 6, 6a, 6b are configured according to the technology described herein, wherein the LOPs 8, 8a, 8b are configured as conventional operating panels each having a push-button 9 (FIG. 2) for the upward direction and/or a push-button 9 for the downward direction. At a lowermost floor L0, the ancillary LOP 6a and the LOP 8a allow only entry of elevator calls in the upward direction, and at an uppermost floor L3, the ancillary LOP 6b and the LOP 8b allow only entry of elevator calls in the downward direction. At intermediate floors L1, L2, the ancillary LOPs 6 and the LOPs 8 allow entry of elevator calls in both directions, wherein entry options for the directions may be arranged above each other (vertical embodiment), as depicted on floor L1, or side-by-side (horizontal embodiment), as depicted on floor L2. Further, regarding the intermediate floors L1, L2, FIG. 1b shows an alternative arrangement of the ancillary LOPs 6a, 6b. Instead of providing one of the ancillary LOPs 6 on the intermediate floors L1, L2, the two ancillary LOPs 6a, 6b may be provided. (separate embodiment). It is contemplated that the building 2 may be provided with elevator operating panels 6, 8 according to the horizontal embodiment, the vertical embodiment, the separate embodiment, or a combination of these embodiments.

Each LOP 8, 8a, 8b and COP 24 includes at least one push-button 9 having an open state (normally open state) and a closed state. To enter an elevator call, the user P presses the push-button 9. Upon being pressed by the user P, the push-button 9 is in the closed state and close a wire loop 21 (FIG. 2) of the respective multicore cable 20, 22. The closed wire loop 21 is detected by the elevator control system 12, which registers the elevator call in response.

Figure 4:
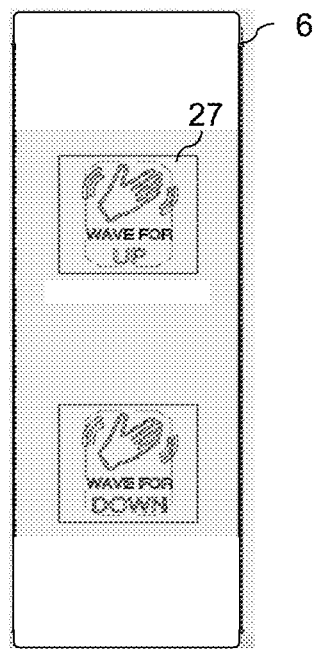
FIG. 4 shows a schematic illustration of an exemplary embodiment of an ancillary elevator operating device for entry of elevator calls in an upward direction and a downward direction.

In FIG. 1a, as well as in an exemplary real-life implementation, the ancillary LOPs 6, 6a, 6b and the ancillary COP 4 are each provided with at least one pictogram of a hand; the hand may be depicted as moving or waving. The pictogram is provided on a side of the respective ancillary LOPs 6, 6a, 6b and the ancillary COP 4 that faces the user P. As only one direction can be entered at the ancillary LOPs 6a, 6b at the (end) floors L0, L3, each ancillary LOP 6a, 6b is provided with one (hand) pictogram only. The ancillary LOPs 6 on the (intermediate) floors L1, L2 are provided with spaced apart pictograms allowing call entries in both directions. The pictogram indicates that the user P can enter an elevator call by holding or moving an object (e.g., a hand) in front of the pictogram without having to touch the ancillary LOP 6, 6a, 6b or the ancillary COP 4. It is contemplated that each pictogram on an ancillary LOP 6, 6a, 6b or the ancillary COP 4 may be supplemented with text such as "wave for down", "wave for up", or similar, or a symbol such as a triangle (as shown in FIG. 1a) or an arrow, or similar, or a combination of text and a symbol. Each pictogram on the ancillary COP 4 may be supplemented with a floor label such as a number (as shown in FIG. 1a), a name and/or a service. Further, it is contemplated that a pictogram other than a hand may be used. In addition, it is contemplated that text and/or a symbol may be provided without a pictogram. One example of such combinations is shown in FIG. 4.

According to the technology described herein, the ancillary LOPs 6, 6a, 6b and the ancillary COP 4 each contain at least one sensor 26 that detects the presence of an object such as a hand that is within a specified distance from it. In one embodiment, each pictogram represents a sensor 26 (and its location) arranged in a housing of the respective ancillary LOP 6, 6a, 6b and the ancillary COP 4. The ancillary LOPs 6a, 6b each contain one sensor 26, and the ancillary LOPs 6 contain two sensors 26, one for each direction. The ancillary COP 4 contains as many sensors 26 as there are floors L served by the elevator system 1. Details of the sensor 26 are described in connection with FIG. 2 and FIG. 3.

Figure 2:
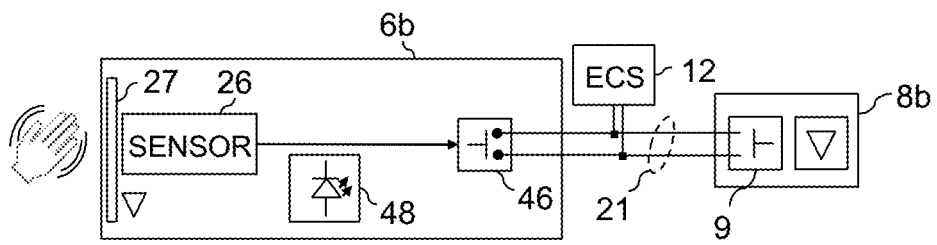
FIG. 2 shows a schematic illustration of an exemplary embodiment of a sensor-equipped ancillary elevator operating device coupled to an elevator control system.

FIG. 2 shows a schematic illustration of a sensor-equipped ancillary elevator operating device coupled to the elevator control system 12. To illustrate the principle configuration of the elevator operating device, only one sensor 26, a switch interface 46 and a light source 48 of the ancillary elevator operating device, are shown. As only one sensor 26 is shown, FIG. 2 shows an arrangement that corresponds to that on the floors L0 and L3 shown in FIG. 1a; hereinafter, reference is made to the ancillary LOP 6b and the LOP 8b, which are arranged next to each other. The ancillary LOP 6b and the LOP 8b are both coupled to the elevator control system 12, as shown in FIG. 2, electrically, the ancillary LOP 6b and the LOP 8b are coupled to the elevator control system 12 in parallel.

The sensor 26 comprises in one embodiment a proximity sensor which may be based on any sensor technology that detects the presence of an object without the object having to physically contact the sensor 26. Such a proximity sensor may include, for example, a capacitive sensor, an inductive sensor, an optical sensor (based on photoelectric, photocell or infrared technology), a thermal sensor, or a radar sensor.

The sensor 26 is coupled to the electrical switch interface 46 which is coupled to the elevator control system 12. The switch interface 46 includes an input terminal to receive a sensor signal and a switch having an open state and a closed state; output terminals of the switch interface 46 are connected to the wire loop 21 of the multicore cable 22. Absent a sensor signal, the switch is in the open state ("normally open state"), as shown in FIG. 2. In the closed state, the switch closes a circuit leading via the wire loop 21 to the elevator control system 12. In one embodiment, the switch interface 46 is part of the ancillary LOP 6, as shown in FIG. 2. In another embodiment, the switch interface 46 may be arranged outside of the ancillary LOP 6, for example, it may be arranged in the (previously installed or preexisting) LOP 8 or arranged in connection with that LOP 8. It is contemplated that the ancillary COP 4 in the car 10 is coupled to the elevator control system 12 in a corresponding manner.

In response to a hand (or another object) being held close to the sensor 26 by the user P, the sensor 26 outputs a sensor signal that causes the switch interface 46 to close the switch. The closing of the switch caused by the user's hand movement at the ancillary LOP 6 corresponds to the user P pressing the up button or the down button of the (conventional) LOP 8. Accordingly, the elevator control system 12 registers the elevator call and confirms registration of that call by causing the light source 48 to light up. The light source 48 includes in one embodiment at least one LED. The light emitted by the light source 48 communicates to the user P that the elevator call has been registered.

Figure 3:
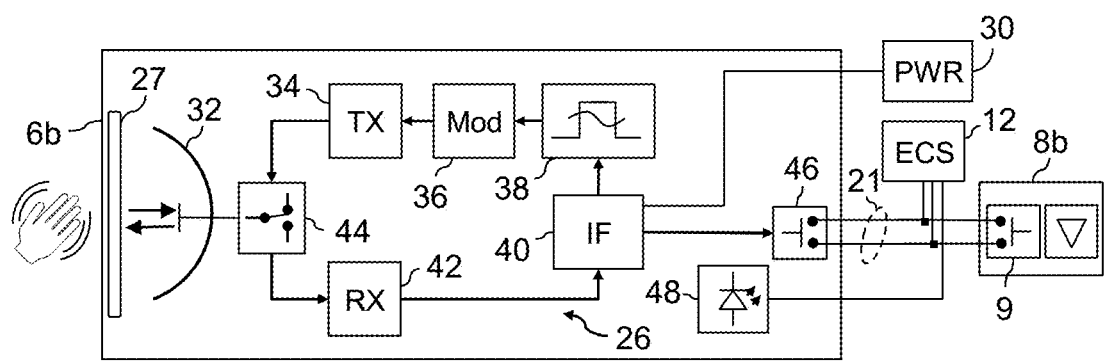
FIG. 3 shows a schematic illustration of an exemplary embodiment of an ancillary elevator operating device having a radar sensor.

FIG. 3 shows a schematic illustration of an ancillary elevator operating device, e.g. the LOP 6b, wherein the sensor 26 is configured as a radar sensor. As in FIG. 2, the ancillary LOP 6b is coupled via the switch interface 46 to the elevator control system 12. In the embodiment of FIG. 3, the ancillary LOP 6b is further coupled to a power supply 30 (PWR) that provides electrical energy to the ancillary LOP 6. The power supply 30 may provide a voltage of 12-24 VDC. In another embodiment, the power supply 30 may be part of the elevator control system 12 and may not be shown as a separate device.

The (radar) sensor 26 includes an antenna 32 and a duplexer 44 coupled to the antenna 32 and configured to switch either a transmit path or a receive path to the antenna 32. The transmit path includes a pulse generator 38 configured to feed its signal into a modulator 36 that is further coupled to a transmitter 34. The transmitter 34 is connected to an input terminal of the duplexer 44. An output terminal of the duplexer 44 is connected to a receiver 42 of the receive path. An interface circuit 40 joins the transmit and receive paths; the interface circuit 40 is further connected to the switch interface 46 and the power supply 30. The operation and function of a radar sensor is known to one of ordinary skill in the art.

The sensor 26 is arranged in the housing of the ancillary LOP 6b. Depending on the type of sensor 26 used, on a user-facing side of the ancillary LOP 6b, a cover 27 may be placed over or in front of the sensor 26 to protect the sensor 26 from environmental conditions such as dirt, water or vandalism. It is contemplated that any cover 27 is selected for the sensor 26 to detect, for example, the hand. For visible or infrared light or other electromagnetic waves (such as radar transmissions), the cover is transparent for these waves. In one embodiment, the cover 27 is made of plastic which is transparent for radar transmissions and visible light. In one embodiment, the light source 48 is also positioned behind the cover 27 and the user P may see the light emitted by the light source 48 through the cover 27 when a call entry is confirmed. Further, such a plastic cover 27 may be engraved with the pictogram, text and/or a symbol. FIG. 4 shows one embodiment of a (double-direction) ancillary LOP 6 for entry of both the upward direction and the downward direction, wherein each cover 27 is engraved with a pictogram and text.

The distance within which the sensor 26 is configured to detect an object, i.e., its detection range, can be adjusted depending on the sensor's use, e.g, whether it is used in a single-direction LOP 6a, 6b, a double-direction LOPE or an ancillary COP 4. For example, the detection range may be set to about 1-5 centimeters. In a double-direction ancillary LOP 6, the detection range may be set to be very short, e.g., about 1-2 centimeters, to avoid that a hand is detected by both sensors 26 of the ancillary LOP 6 at the same time. Similar considerations apply to the ancillary COP 4 where several sensors 26 are arranged side by side. In a single-direction LOP 6a, 6b, the detection range may be set to be longer, e.g., about 2-5 centimeters.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there has been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

The invention claimed is:

1. An elevator system, comprising:
    an elevator controller system configured to control the elevator system to move an elevator car between a predetermined number of floors of a building;
    an elevator operating panel communicatively coupled via a multicore cable to the elevator controller system, wherein the elevator operating panel includes at least one push-button having an open state and a closed state, wherein the push-button is configured to close in the closed state a wire loop of the multicore cable, said wire loop connected to the elevator operating panel, and wherein the push-button is configured to be in the closed state when a user presses the push-button to enter an elevator call;
    a switch interface in connection with the wire loop; and
    an ancillary operating panel arranged in the vicinity of the elevator operating panel and having a proximity sensor configured to output a sensor signal to the switch interface if an object presented by the user is within a preset detection range of the proximity sensor,
    wherein the sensor signal causes the switch interface to change from an open state to a closed state, and
    wherein the switch interface is configured to close in the closed state the wire loop when the user presents the object to enter an elevator call without physical contact with the ancillary operating panel.

2. The elevator system of claim 1, wherein the ancillary operating panel is arranged on one of the floors, and wherein the proximity sensor is assigned to a predetermined travel direction.

3. The elevator system of claim 2, wherein the ancillary operating panel includes two proximity sensors, one being assigned to an upward travel direction and the other being assigned to a downward travel direction.

4. The elevator system of claim 1, wherein the elevator operating panel is arranged on an intermediate floor of the building and includes a push-button for an upward travel direction and a push-button for a downward travel direction, and wherein a first ancillary operating panel for the upward travel direction and a second ancillary operating panel for the downward travel direction are arranged next to the elevator operating panel.

5. The elevator system of claim 1, wherein the ancillary operating panel is arranged in the elevator car and includes a predetermined number of proximity sensors, wherein the predetermined number corresponds to the predetermined number of floors, and wherein each proximity sensor is assigned to one of the floors.

6. The elevator system of claim 3, wherein the ancillary operating panel is arranged in the elevator car and includes a predetermined number of proximity sensors, wherein the predetermined number corresponds to the predetermined number of floors, and wherein each proximity sensor is assigned to one of the floors.

7. The elevator system of claim 1, wherein the ancillary operating panel comprises a cover arranged in front of the proximity sensor.

8. The elevator system of claim 7, wherein the cover includes at least one of a pictogram, text and a symbol.

9. The elevator system of claim 1, wherein the proximity sensor comprises a radar sensor.

10. The elevator system of claim 1, wherein the ancillary operating panel comprises a light source configured to light up in response to the user presenting the object.

* * * * *